United States Patent [19]

Kai

[11] 4,392,242
[45] Jul. 5, 1983

[54] MOBILE COMMUNICATION SYSTEM

[75] Inventor: Tomokazu Kai, Tokyo, Japan

[73] Assignee: Nippon Electric Co., Ltd., Tokyo, Japan

[21] Appl. No.: 240,937

[22] Filed: Mar. 5, 1981

[30] Foreign Application Priority Data

Mar. 10, 1980 [JP] Japan ................. 55-30127

[51] Int. Cl.³ .................................... H04B 1/00
[52] U.S. Cl. ........................ 455/33; 455/34; 455/56; 455/62; 340/825.44
[58] Field of Search ................. 455/31–34, 455/54, 56, 62, 89, 77, 76; 179/2 EB; 340/825.44

[56] References Cited

U.S. PATENT DOCUMENTS

| | | |
|---|---|---|
| 3,663,762 | 5/1972 | Joel, Jr. |
| 3,913,017 | 10/1975 | Imaseki ................. 455/33 |
| 3,983,492 | 9/1976 | Fisher et al. ............ 455/62 |
| 4,127,744 | 11/1978 | Yoshikawa et al. ...... 455/54 |
| 4,144,412 | 3/1979 | Ito et al. ................. 455/33 |
| 4,308,429 | 12/1981 | Kai et al. ............... 455/33 |

Primary Examiner—Jin F. Ng
Attorney, Agent, or Firm—Blakely, Sokoloff, Taylor & Zafman

[57] ABSTRACT

There is provided a mobile transmission system wherein a plurality of radio zones, each including one radio base station, the base stations of all radio zones being controlled by a control center which controls a paging and an origination of a mobile, are arranged to form a service area, and each radio zone is provided with at least one mobile access channel and a single mobile paging channel assigned with radio frequency common to all radio zones, thus establishing speech channels for the mobiles. The frequency of the mobile access channel is made to be different for adjacent radio zones and one or more frequencies are allocated to each base station. The control center is provided with a system for controlling an origination signal of the mobile for selecting at least one channel among available channels allocated to a radio base station associated with the mobile, circuit switching system operatively connected to the origination control system, for establishing the mobile access channel, and a system for broadcasting a channel number of the established mobile access channel to all radio zones through the mobile paging channel. Each mobile is provided with a receiver for receiving the channel number of the mobile access channel, means for updating and storing the received channel number, and a system for sequentially receiving radio waves transmitted through the stored access channel and for comparing received field intensities from the radio zones with each other to select a mobile access channel adapted to send out an origination signal of the mobile.

3 Claims, 14 Drawing Figures

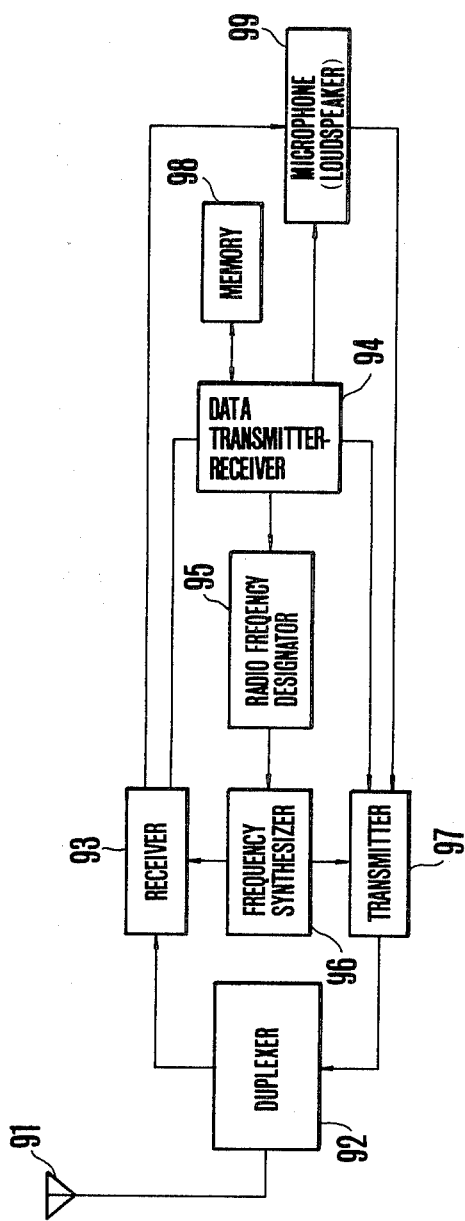
F I G.10

MOBILE COMMUNICATION SYSTEM

BACKGROUND OF THE INVENTION

This invention relates to a vehicle communication system comprising a number of radio zones.

In a mobile communication system in which a service area is constituted by a plurality of radio zones each installed with a base station provided with a plurality of channels, a common control channel system is generally used including a mobile paging channel (P-CH) and a mobile access channel (A-CH) which are used to establish a speech channel (S-CH) so as to decrease the set-up time of a call connection and to efficiently utilize frequencies.

As disclosed on pages 1172–1190 of "Review of Electrical Communication Labaratories" Vol. 25, Nos. 11-12, 1977 published by Nippon Telegraph and Telephone Public Corporation, when making a mobile terminating call through a paging channel (P-CH), a page code is sent from a control center to a mobile. Then the mobile sends out a page response code in response to the page code. In a case shown in FIG. 1, a control center CC sends the page code to both base stations BS1 and BS2. Where a mobile is in a radio zone of the base station BS1, the page response code is sent back to the control center CC via the base station BS1. Since the control center receives the page response code from the mobile by way of the base station BS1, it sends an idle channel number among a number of channels allocated to the base station BS1 by means of a channel assign code to the mobile. In the mobile, the channel is skipped to the assigned channel, and after checking the loop a bell is rung. Then the mobile subscriber station (MSS) permits a mobile subscriber to begin talking. In this system, many mobiles utilize the paging channel P-CH on the time division basis to improve the utilization efficiency.

As shown in FIG. 2, the access channel is used at the time of a mobile originating call. More particularly, in the mobile, the channel is changed from the paging channel P-CH to the access channel A-CH through which an access-channel-mark code is sent out. Since the control center CC receives the origination code from the base station BS1, it selects an idle channel out of a number of channels allocated to the base station BS1 for sending a channel assign code to the mobile through the access channel. The mobile skips to the assigned channel to make a loop check and sends out a dial code to begin talking.

Reservation of an access channel is necessary because where an idle channel among a number of speech channels is selected to transmit an origination code therethrough and then utilize the selected channel as a speech channel it takes a long time to search the idle channel. Where the access channel is fixed, however, it can not convey as much traffic as that of the paging channel because individual mobiles simultaneously send origination codes at a high probability, resulting in a so-called call collision.

In a most widely used vehicle communication system, as the channel exclusively used as a paging channel was provided for each base station a single channel having a predetermined frequency common to all zones, whereas as control channels exclusively used for accessing were provided for each base station one or more channels having predetermined frequencies common to all zones, the number of channels being determined by a maximum expectant number of the mobiles moving into or out of the service area of each base station.

More particularly, the frequency of the radio carrier signal and the phase of the modulated signal are adjusted in an overlapped zone to minimize interference between these signals. Thus, as shown in FIG. 3 in radio zones I and II, a frequency f1 is allocated to the paging channel P-CH and frequencies f2 and f3 to the access channel A-CH.

In the mobile communication system described above, there is no problem in the mobile paging channel, but in the case of the mobile access channel, as it utilizes specific frequencies common to all zones, the number of transceivers in each base station increases greatly, thus increasing the cost of installation as will be described later in more detail. On the other hand, when the number of the transceivers is fixed, the number of the speech channels decreases proportionally.

From the standpoint of the increase in the number of the speech channels where the traffic is busy, it is desirable to use the mobile access channel as a speech channel.

SUMMARY OF THE INVENTION

Accordingly, it is an object of this invention to provide a novel mobile communication system capable of providing many more speech channels with simple construction.

Another object of this invention is to provide a mobile communication system capable of utilizing all transceivers, except those used in a mobile paging channel, for speech channels without impairing the speech performance of the base station.

According to one embodiment of this invention there is provided a mobile communication system wherein a plurality of radio zones each including one base station, the base stations of all radio zones being controlled by a control center, are arranged to form a service area, and each radio zone is provided with at least one mobile access channel and a single mobile paging channel assigned with a radio frequency common to all radio zones, thus enabling to establish speech channels for the mobiles, characterized in that said at least one mobile access channels of one radio zone is assigned with a radio frequency which is different from that assigned to adjacent radio zones, and the mobile is provided with means for sequentially receiving radio waves transmitted on the access channels at the assigned frequencies and means for comparing field intensities of the received radio waves, for selecting a mobile access channel through which an origination signal is to be sent out from the mobile.

According to another embodiment there is provided a mobile communication system wherein a plurality of radio zones, each including one radio base station, the base stations of all radio zones being controlled by a control center which controls a paging and an origination of a mobile, are arranged to form a service area, and each radio zone is provided with at least one mobile access channel and a single mobile paging channel assigned with a radio frequency common to all radio zones, thus enabling to establish speech channels for the mobiles, characterized in that the at least one mobile access channel of one radio zone is assigned with a radio frequency which is different from that assigned to adjacent radio zones, the common radio control station is provided with means for controlling an origination of the mobile for selecting at least one channel among available channels allocated to a radio base station associated with the mobile, circuit switching means operatively connected to the origination control means, for establishing the mobile access channel, and means for broadcasting a channel number of the established mobile access channel to all radio zones through the mobile paging channel; and wherein each mobile is provided with a receiver for receiving the channel number of the mobile access channel, means for updating and storing the received channel number, and means for sequentially receiving radio waves transmitted through the stored access channel and for comparing received field intensities to select a mobile access channel adapted to send out an origination signal of the mobile.

BRIEF DESCRIPTION OF THE DRAWINGS

In the accompanying drawings:

FIG. 10 is a block diagram showing one example of a mobile station;

DESCRIPTION OF THE PREFERRED EMBODIMENTS

Figure 1:
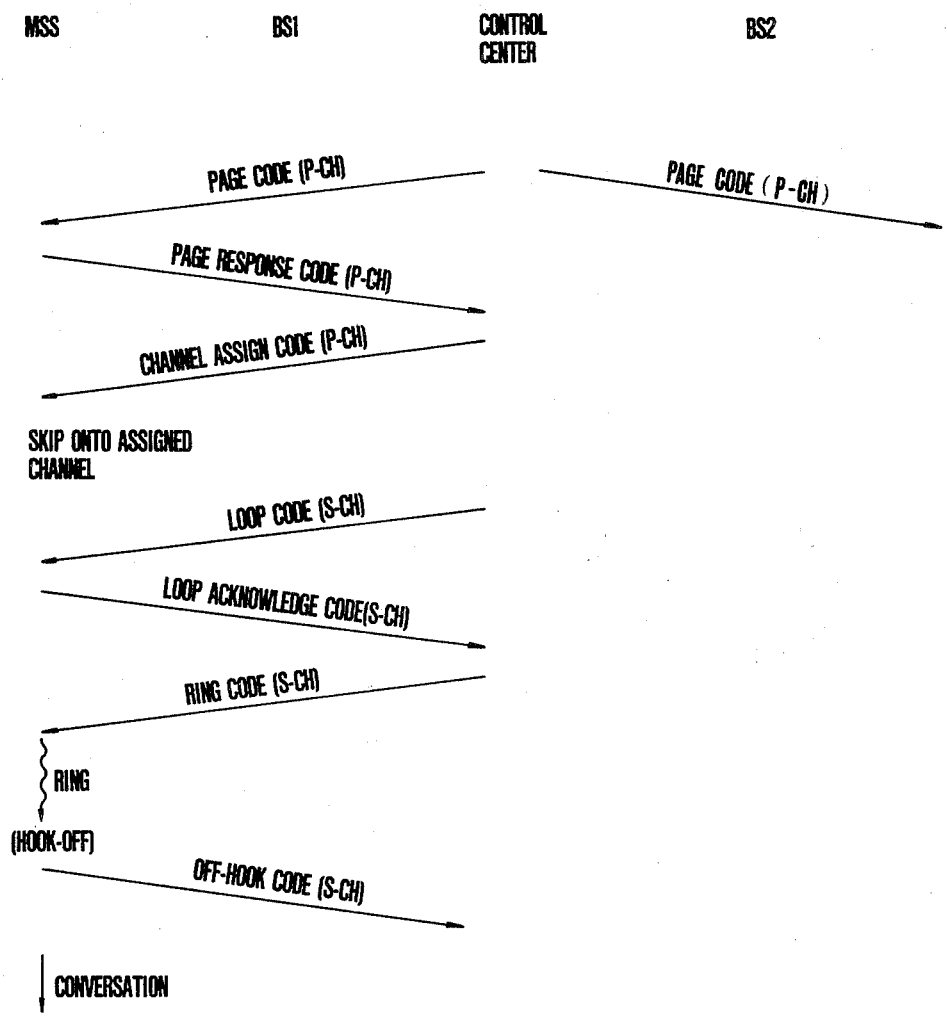
FIGS. 1 and 2 are charts showing exchange of various codes between a control center and a mobile at the time of paging and access before talking.
Figure 2:
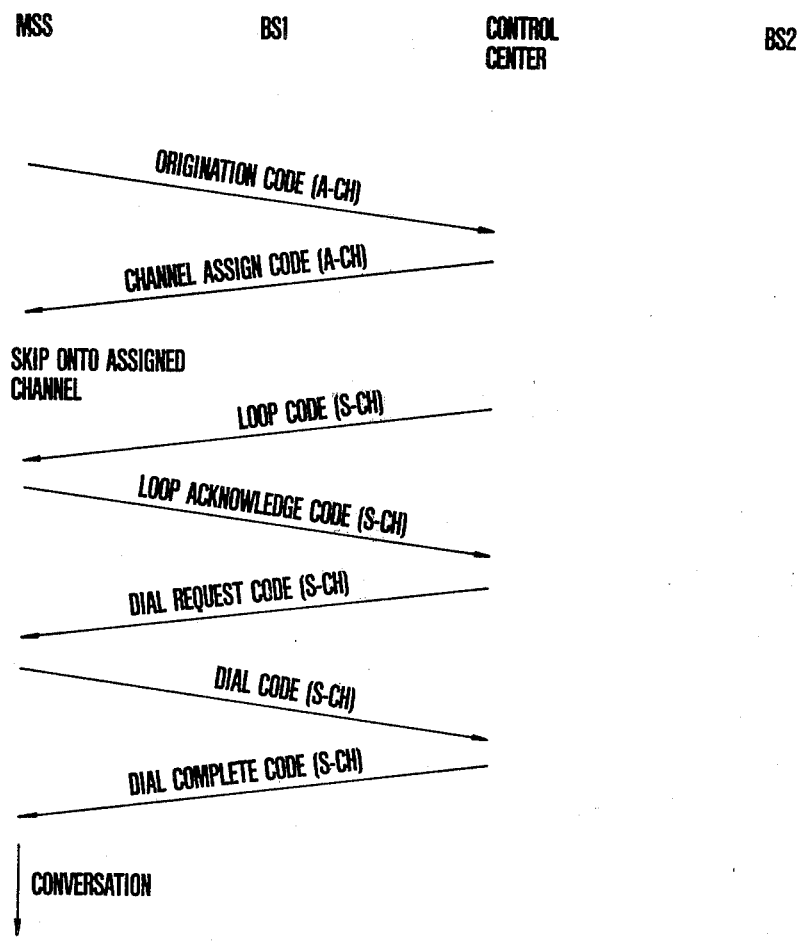
Figure 3:
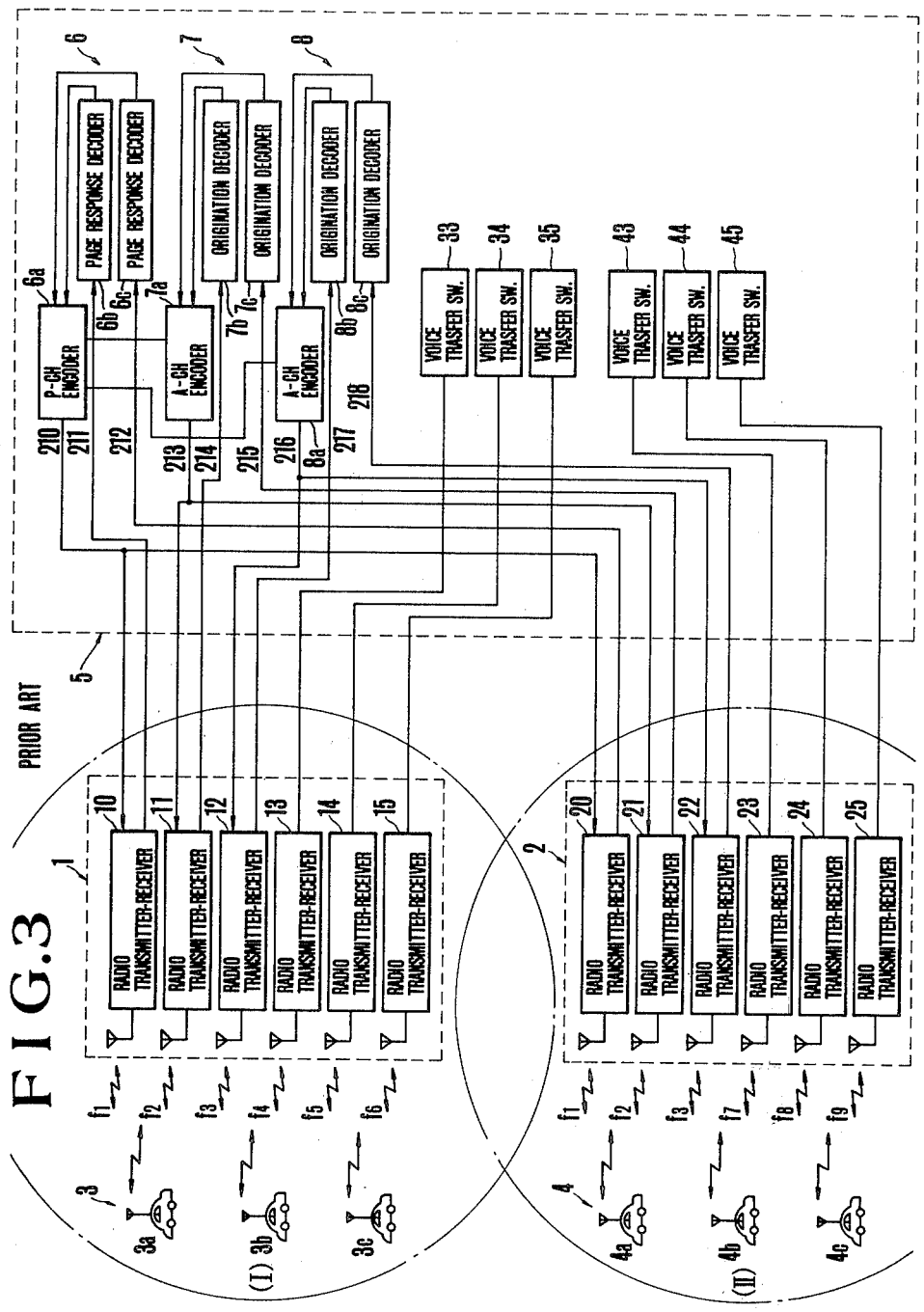
FIG. 3 is a block diagram of a prior art mobile communication system.

For the sake of simplicity, in FIG. 3 showing a prior art mobile communication system, only two base stations 1 and 2 are shown, and the number of radio transmitter and receivers or transceivers in each base station is 6. This communication system generally comprises radio zones I and II within the range of the radio waves from the base stations 1 and 2, mobile units 3 and 4, and a control center 5 controlling all base stations. A paging control unit 6 and access control units 7 and 8 are provided in the control center 5.

Figure 4:
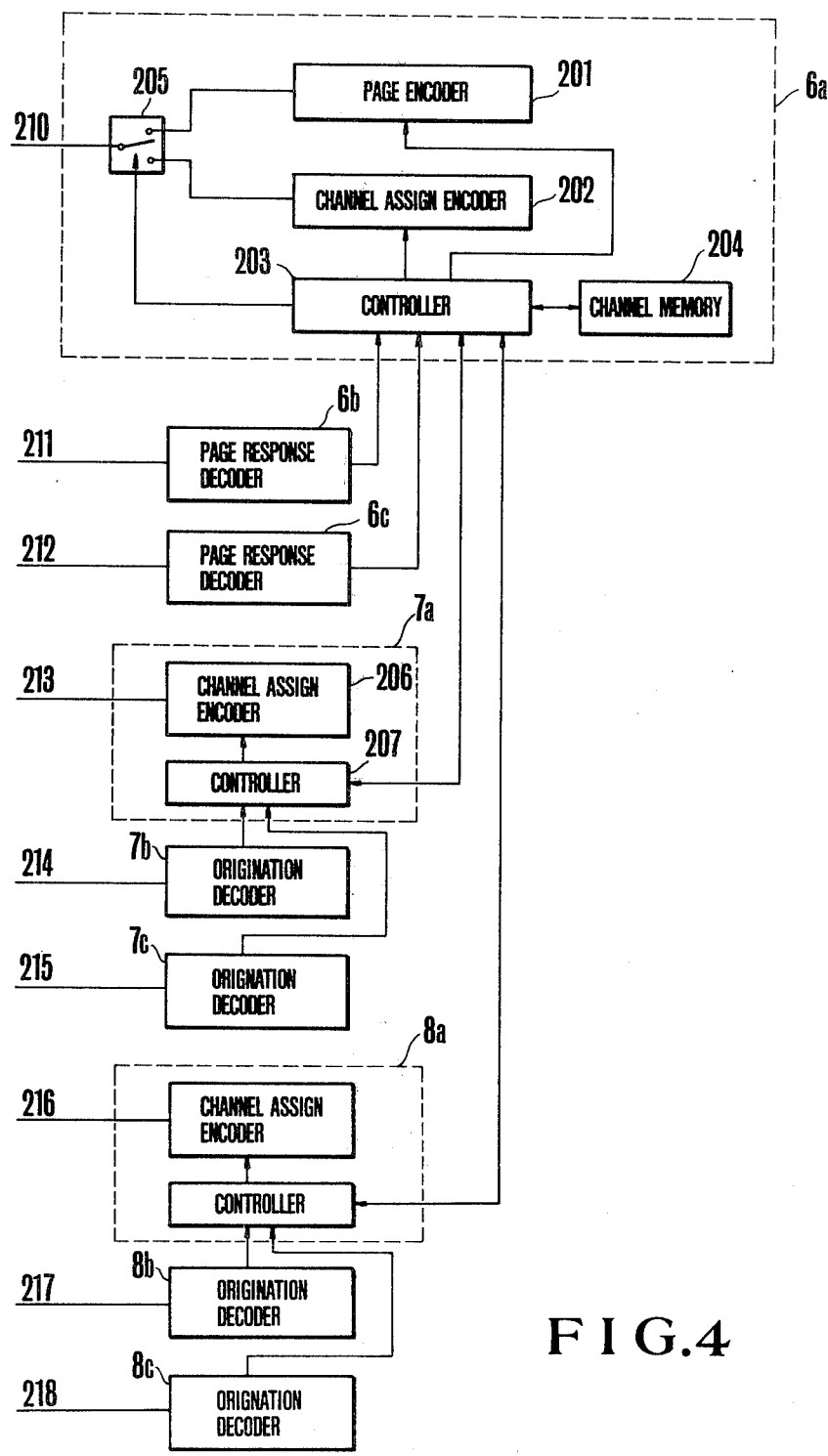
FIG. 4 is a block diagram showing details of a control center.

Details of the control center 5 are shown in FIG. 4. A page encoder 201 of page channel connection signal transmitting and system controlling section 6a is constituted by a paralled-in-serial-out type shift register and started by a start signal from a controller 203 to produce a page code to be sent to mobiles via a transfer switch 205. A channel assign encoder 202 is also constituted by a parallel-in-serial-out type shift register and operates to transmit via the transfer switch 205 the channel number of an idle speech channel stored in a channel memory device 204 to a mobile which has transmitted a page response.

Page response decoders 6b and 6c are constituted by serial-in-parallel-out type shift registers, and when they receive a page response code from a mobile, they inform this fact to the controller 203.

An origination code from a mobile in the radio zone I is received by either one of serial-in-parallel-out type shift registers 7b and 8b which are selected by the mobile subscriber. These shift registers act as origination decoders. In this example, it is assumed that the shift register 7b has been selected. Then the output of the shift register 7b is applied to a controller 207 of a section 7a. The controller 207 discriminates radio zones RZ1 and RZ2 (in this example RZ1) and requests the controller 203 to designate an idle channel. Then the controller 203 informs an idle speech channel stored in the channel memory device 204 to the controller 207. The controller 207 sets the channel number of the idle channel in a channel assign encoder 206 and sends out this channel number to the mobile as a channel assign code. Where the origination code is inputted to an origination decoder 7c associated with the radio zone II, the same operation is made except that the radio zone to be searched is different. Where the orignation code is inputted to decoders 8b and 8c, simillar processing is made with a similar controller in a decoder 8a.

Figure 5:
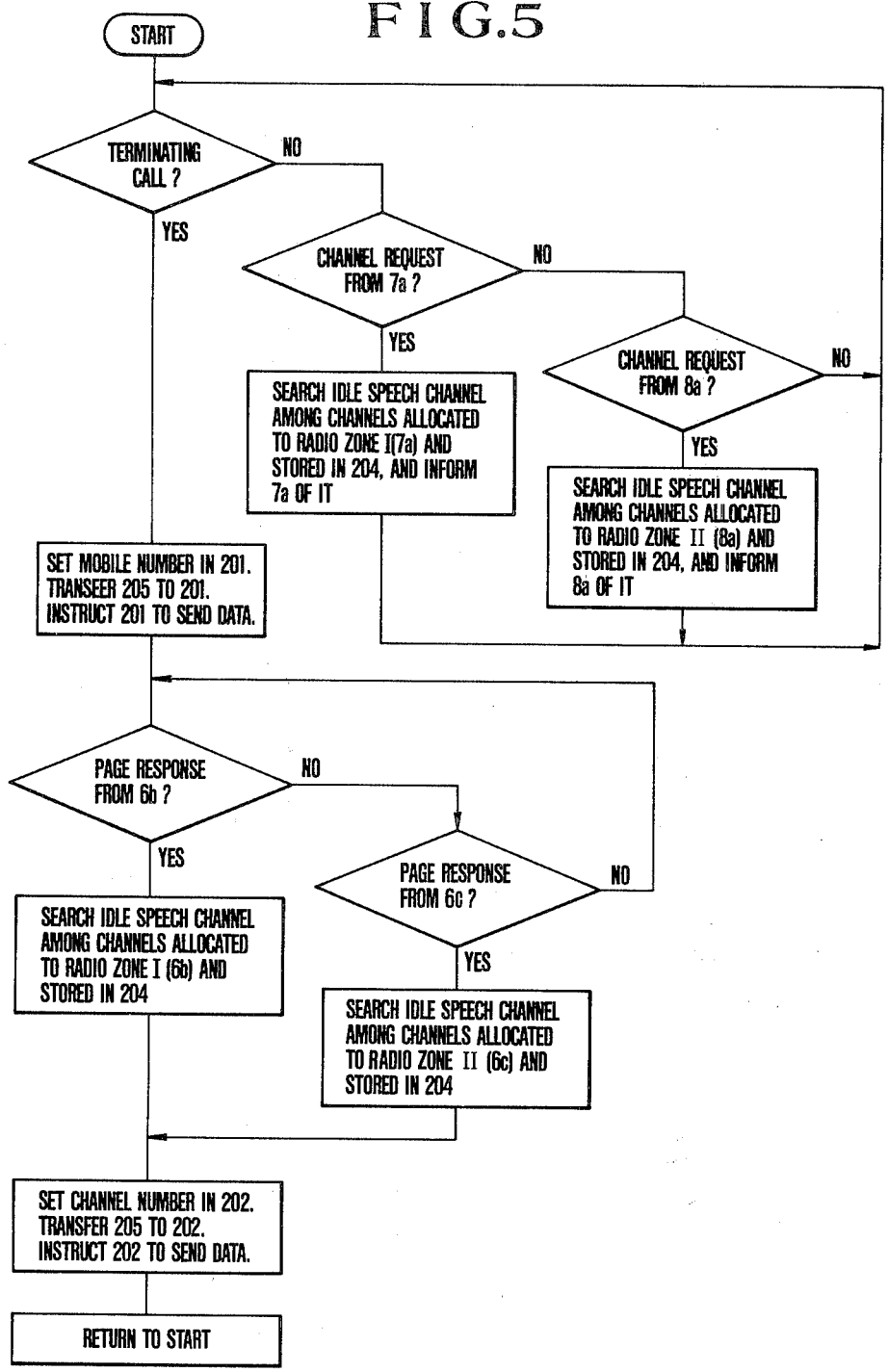
FIGS. 5 and 6 are flow chart showing the operation of a controller in the FIG. 4 control center.
Figure 6:
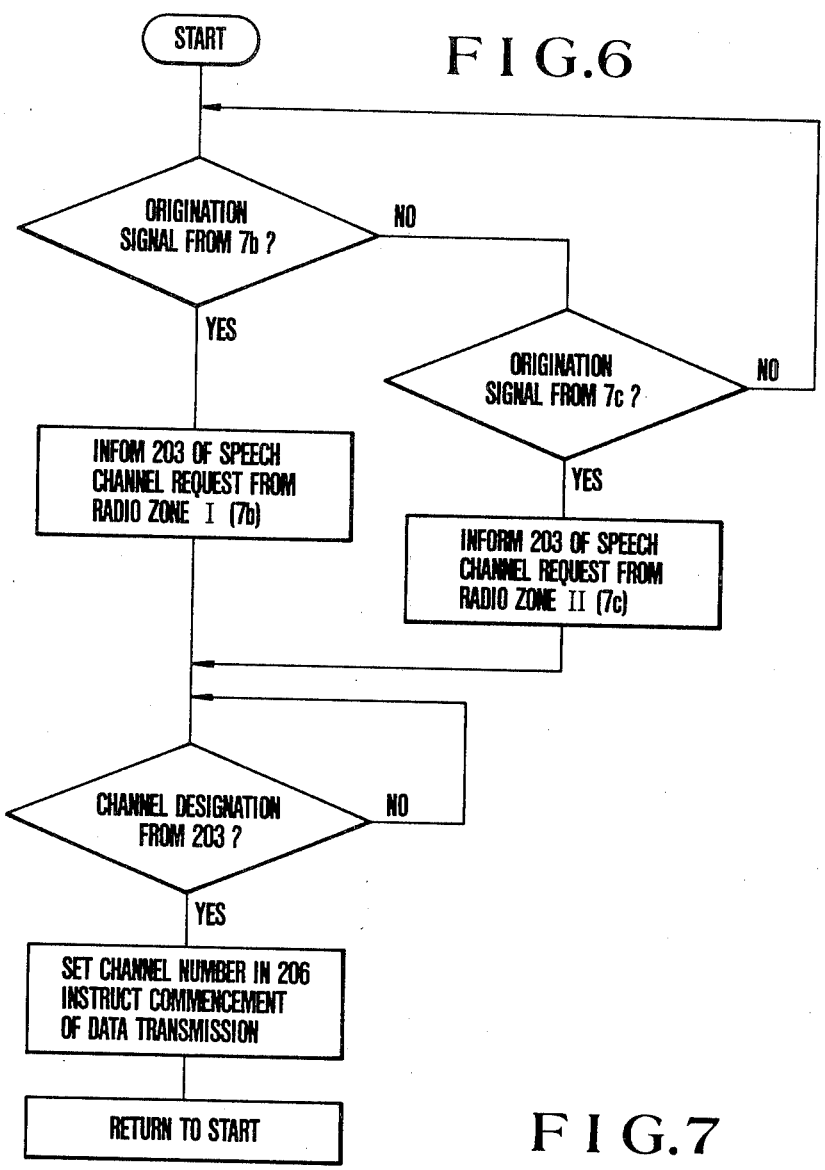

The flow charts of the controllers 203 and 207 are shown in FIGS. 5 and 6, respectively.

Each base station is provided with six radio transmitter-receivers 10-15 and 20-25 and the control center 5 is provided with voice transfer switches 33-35 and 43-45.

Figure 7:
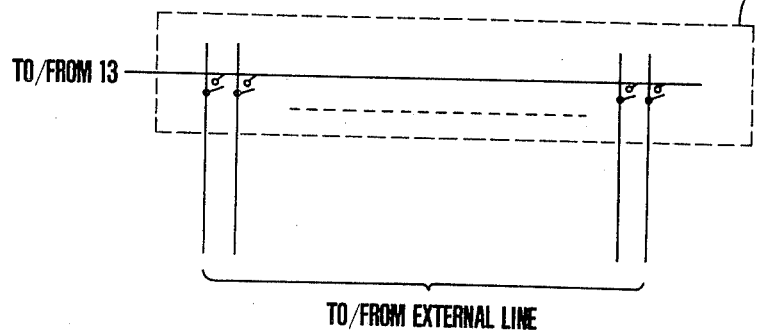
FIG. 7 shows a connection of a voice transfer switch.

Each of the switches 33-35 and 43-45, is used to interconnect an ordinary telephone line and an approach line and has a construction similar to a switch circuit shown in FIG. 7 utilized in a conventional telephone exchange.

Since the operation of the mobile communication system shown in FIG. 3 is well known in the art and can be readily understood from the description of the embodiment of this invention, it will not be described here.

Simply, except the frequency of radio transmitter-receivers 10 or 20 for the paging channel, since two frequencies are assigned to the access channel, each base station is provided with two radio transmitter-receivers 11 and 12 and 21 and 22. As a consequence the number of channels that can be used as the speech channels in each base station is three as can be noted from the number of the voice transfer switches 33-35 or 43-45.

Considering the number of effective access channels of the communication system, the channel frequencies f2 and f3 of the channels are common to the entire system so that while these channel frequencies are used in the radio zone I, the other zones can not use them. Accordingly, when a mobile 3 in the radio zone I and a mobile 4 in the radio zone II wish to use a channel, irrespective of the presence of two transceivers in each base station, the available access channel is only one for each base station. When each of two mobiles 3a and 3b, for example, in the radio zone I wishes to use a channel, it is possible to utilize two channels. But in this case in the other radio zone II, since these two channel can not be used, it is possible to use only one channel on the average. Thus, when it is desired to have two effective access channels, it is necessary to provide additional two line connection signal controllers. This reduces the number of the speech channels by two, leaving only one channel. The above-described data show an extreme case because the number of channels per one base station is small. Let us consider an actual example. Suppose now that the number of the radio zones is 8, that the number of the radio transmitter-receivers of each radio zone is 100 (except the transceiver for the paging channel) and that the number of access channels necessary for each service area is 5. Then the total number of the access channel radio transmitter-receivers over all base stations is 5×8=40. Accordingly, the number of the encoders and decoders of the access channel controllers also becomes 5×8=40.

As can be noted from the foregoing description, when one attempts to use the access channel as the speech channel in one zone, such a channel can not be used either as the access channel or the speech channel in the remaining zone. In other words, installed transmitter-receivers are not used efficiently.

Figure 8:
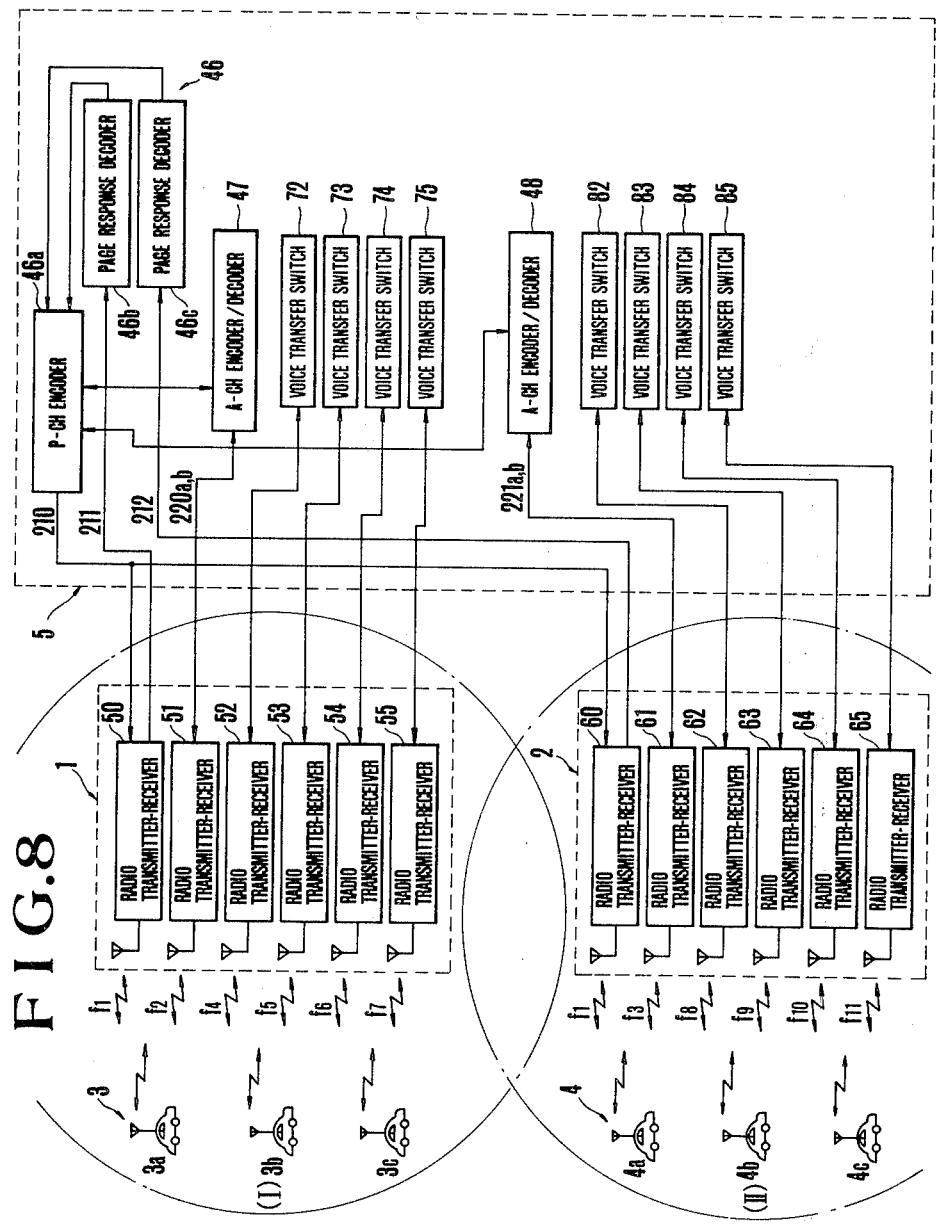
FIG. 8 is a block diagram showing one embodiment of this invention.

FIG. 8 illustrates a simplified block diagram of one embodiment of this invention. In this case, like FIG. 3, the number of the base stations is 2 and the number of the radio transmitter-receivers in each base station is 6. Ignoring the frequency, respective component elements are identical to those shown in FIG. 3 and reference numerals are equal to those used in FIG. 3 plus 40. The system shown in FIG. 8 is different from that shown in FIG. 3 in that transmission controllers 47 and 48 are connected to transmitters 51 and 61 respectively. For this reason, the provision of an access line connecting signal receiver in individual base stations is dispensed with so that it is not necessary to divide it into a plurality of circuits designated by numerals with suffixes a, b and c. Such a system can operate satisfactory when the operation of the mobile units is adaptive to the system as will be described with reference to FIG. 10. Of course, two access channels of at least two adjacent base stations should have different frequencies for the purpose of preventing interference therebetween.

Figure 9:
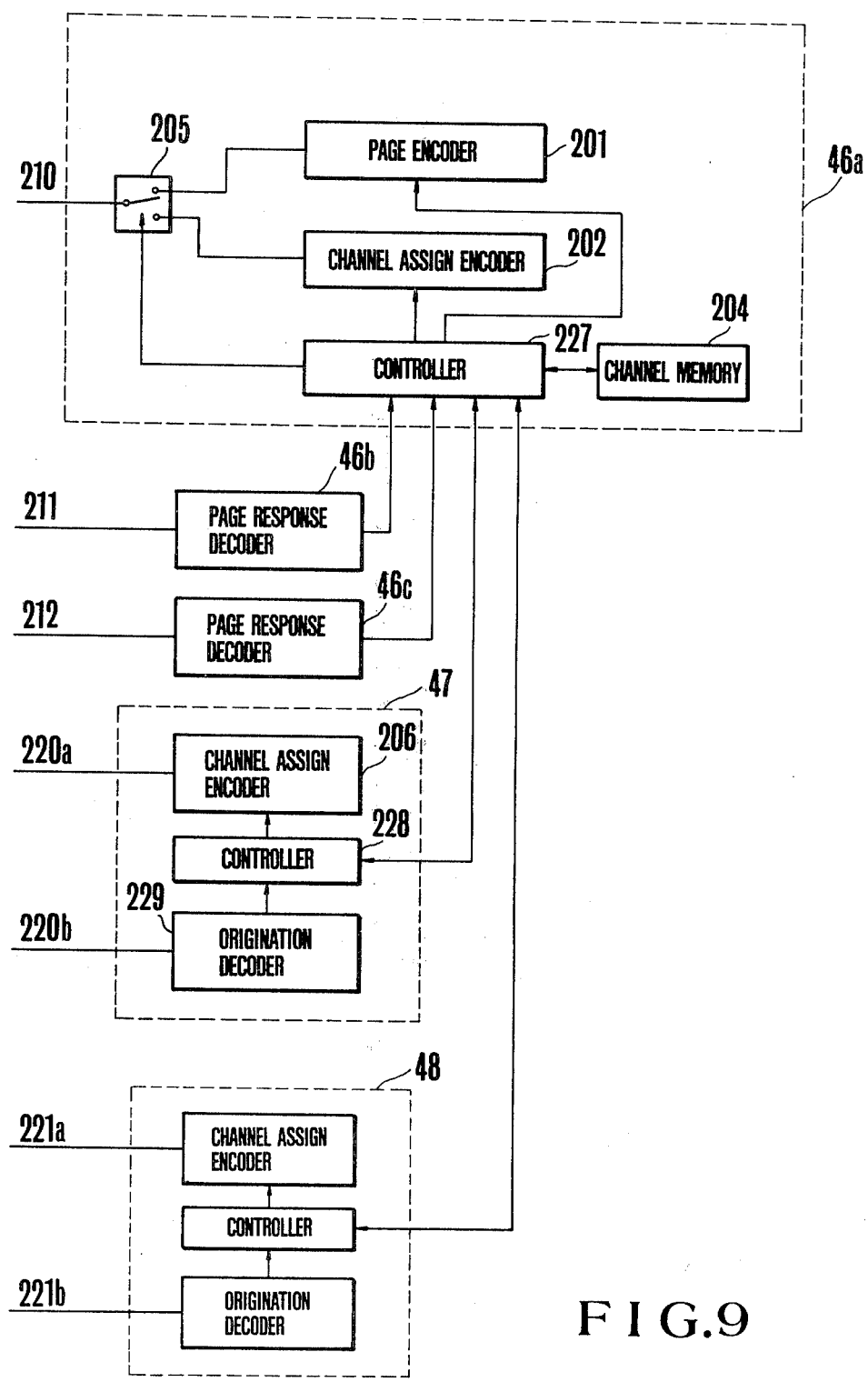
FIG. 9 shows details of blocks 46a, 47 and 48 shown in FIG. 8.

Details of blocks 46a and 47 shown in FIG. 8 is shown in FIG. 9 Although these blocks operates substantially in the same manner as the elements 6a and 7a shown in FIG. 4 they are different in that since controllers 227 and 228 are not required to discriminate radio zones I and II, it is not necessary to exchange a signal required for effecting such a discrimination. Blocks 47 and 48 operate in the same manner.

FIG. 10 is a block diagram showing one example of the construction of the electric circuit carried on a mobile. This electric circuit comprises an antenna 91, a duplexer 92, a receiver 93, a data transmitter-receiver 94 having capabilities of encoding, decoding and comparison of field intensities of signals as well as sequence control capability, a frequency synthesizer 96, a transmitter 97 and a memory device 98 storing channel numbers (or letters or symbols) of all access channels and the corresponding field strength values. These channel numbers are sent from a mobile paging signal controller 46 through transceivers 50 and 60 as system information to a mobile and stored in the memory device 98 via antenna 91, receiver 93 and data transmitter-receiver 94. Reference numeral 99 denotes a microphone or loudspeaker.

In a mobile communication system constructed as shown in FIGS. 8 and 10, the system information or a vehicle paging signal is simultaneously transmitted from the paging line signal transmitter 46a through radio transmitter-receivers 50 and 60 and received by all mobiles, and a radio signal received by antenna 91 and duplexer 92 is demodulated by receiver 93 and is then decoded by data transmitter-receiver 94.

When the received signal is a paging code, a paged mobile transmits an up-linked paging response code of the same frequency. Where the mobile is in the zone I, the sent back response signal is received by a paging line connection signal receiver 46b via the transceiver 50. The paging line connection signal transmitter 46a capable of controlling the system judges that the mobile is in the radio zone I according to the received signal, thus designating a speech channel among idle channels of the radio zone I so as to send out the channel number of the speech channel. The mobile receiving the designated channel number commences a conversation through a channel of that channel number.

When the received signal contains a channel number of the access channel as the system information, the content of the memory device is updated by the channel number decoded by the data transmitter-receiver 94.

When a mobile sends out an origination signal, the channel number allocated as the access channel and stored in the memory device 98 is read out by the data transmitter-receiver 94 and channels are sequentially designated for the frequency synthesizer 96 by using a radio frequency designator 95 so as to sequentially receive both of the transmitted wave (a transmission output of the radio transmitter-receiver 51 at a frequency f2) of the access channel in the radio base station 1 and the transmitted wave (a transmission output of the radio transmission-receiver 61 at a frequency f3) of the access channel in the radio base station 2 and to compare the field strengths of respective input signals at different frequencies f2 and f3, thus selecting a radio base station having stronger field (in this example the field intensity of the transmitted wave of the radio base station 1 is stronger than that of the base station 2). The mobile sends out an origination signal through the access channel of the selected radio zone. The sent out signal is received by an A-CH encoder/recoder 47 via radio transmitter-receiver 51. Accordingly, a suitable line is selected from idle channels of the radio zone I so as to designate the speech channel number through the radio transmitter-receiver 51 for the mobile which has sent out the origination signal. The mobile which has received the designated channel number commences a conversation through a channel of that channel number.

Figure 11:
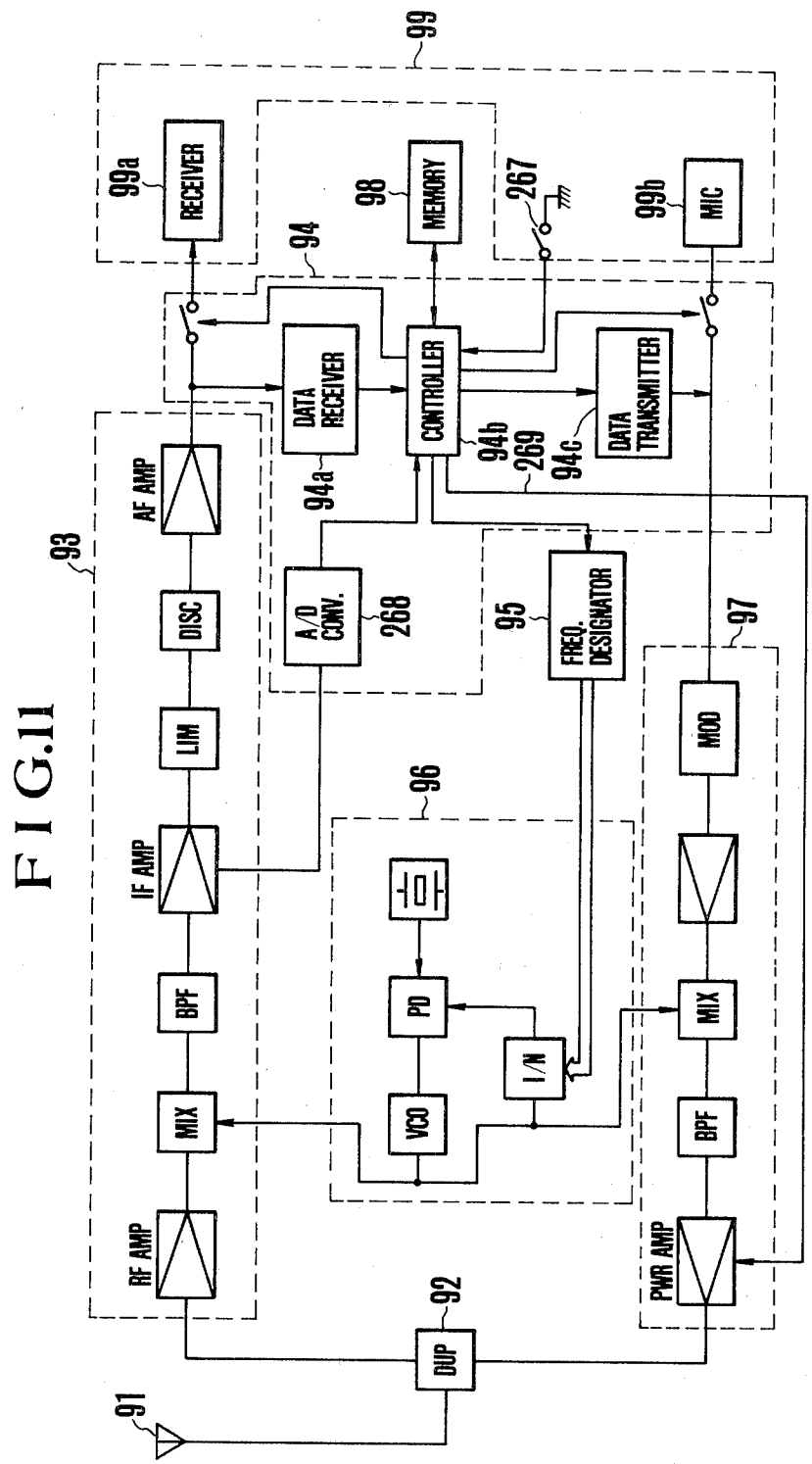
FIG. 11 is a block diagram showing details of the FIG. 10 circuit.

FIG. 11 shows details of one example of the mobile unit circuit arrangement as shown in FIG. 10. This unit circuit arrangement comprises a transmitter-receiver including a frequency synthesizer of a well known phase locked loop (PLL) type.

Describing in more detail with this transmitter and receiver, where a controller 94b designates a channel number of a predetermined paging channel P-CH for a radio frequency designator 95, a local frequency of the frequency synthesizer 96 is supplied to receiver 93 and transmitter 97 and locked in the paging channel P-CH.

Under this condition, system information code from an antenna 91 is demodulated by receiver 93 and then inputted to a data receiver 94a which is constituted by a serial-in-parallel-out type shift register so as to apply the received signal to the controller 94b as parallel signals. The controller 94b decodes the channel number that has designated an access channel among the system information codes thus storing the decoded channel number in a memory device 98. Where the access channel is predetermined, it is prestored in the memory device 98.

When a mobile subscriber hooks-off, a signal from a hook switch 267 is applied to the controller 94b. At this time, the controller 94b commences to apply one of the access channel numbers stored in the memory device 98 to the frequency controller 95 to start reception of the first access channel. Where an intermediate frequency amplifier 254 is made of the type CA3089 sold by RCA Corporation, a received field strength can be obtained and the controller 94b stores the field strength of the first access channel in the memory device 98 via an analogue-digital converter 268. Then the channel number of the second access channel is again designated for the frequency designator 95 for storing the field strength at that time in the memory device 98. In this manner, all access channels informed by the system information codes are scanned for storing respective field strengths in the memory device 98. Thereafter, the field strengths are compared with each other for selecting an access channel having the largest field strength.

The controller 94b causes the frequency synthesizer 96 to lock an access channel regarding the largest field so as to set an origination code in the data transmitter 94c of the parallel-in-serial-out type shift register, and activates a power amplifier 262 by a carrier on/off signal on line 269 produced by the controller 94b to send out an origination code.

A speech channel assigned by a control center via a base station as a response of the origination code is set in the frequency designator 95 via the data receiver 94a and the controller 94b in the same manner as the reception of the system information code to switch the frequency of the mobile to the assigned channel.

Figure 12:
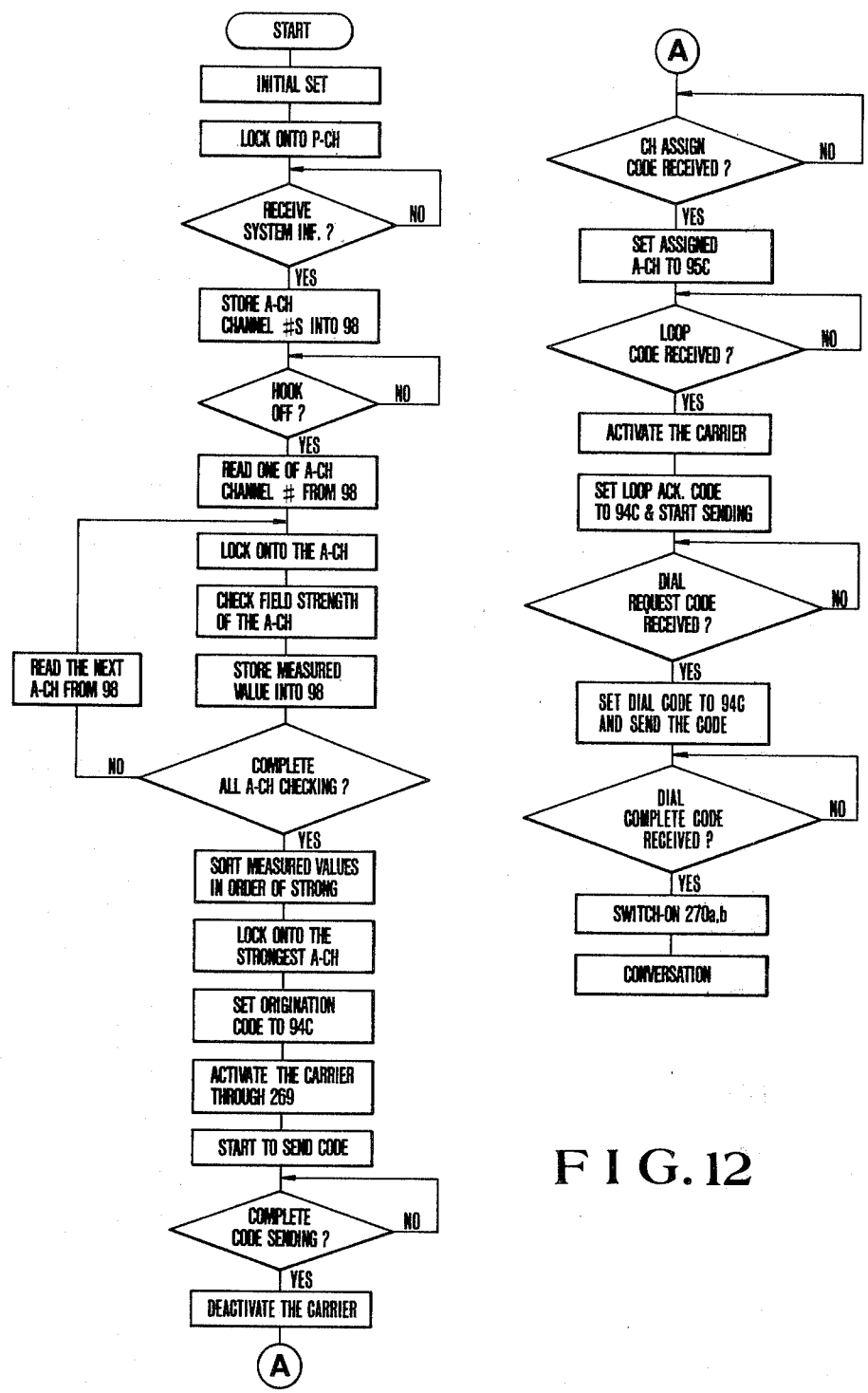
FIG. 12 is a flow chart for explaining the operation of controller 94b shown in FIG. 11.

FIG. 12 is a flow chart showing the operation of the controller 94b. Although the operation of mobile terminating call is not shown in FIG. 12, as it is not directly related to this invention, it is omitted.

The embodiment operates in a manner described above, but in the system shown in FIG. 8, among five channels that can be used for communication, the access channel is one and the remaining four channels are used as the speech channels. If two channels are used as the access channels, the speech channels are 3, thus increasing the number of the speech channels than the system shown in FIG. 3. In an actual example, where the number of the zones is 8, and where subscribers are distributed evenly in each zone, the number of the access channel transmitter and receiver is one for each zone, the number of the access channel transmitters and receivers for the entire zones is 8, and the numbers of the access channel encoders and decoders are 8 respectively.

Comparing these data with those of the prior art system shown in FIG. 3, the number of the radio transmitter and receivers is reduced by 4 in each radio base station, meaning a significant difference as the number of the zones increases.

Figure 13:
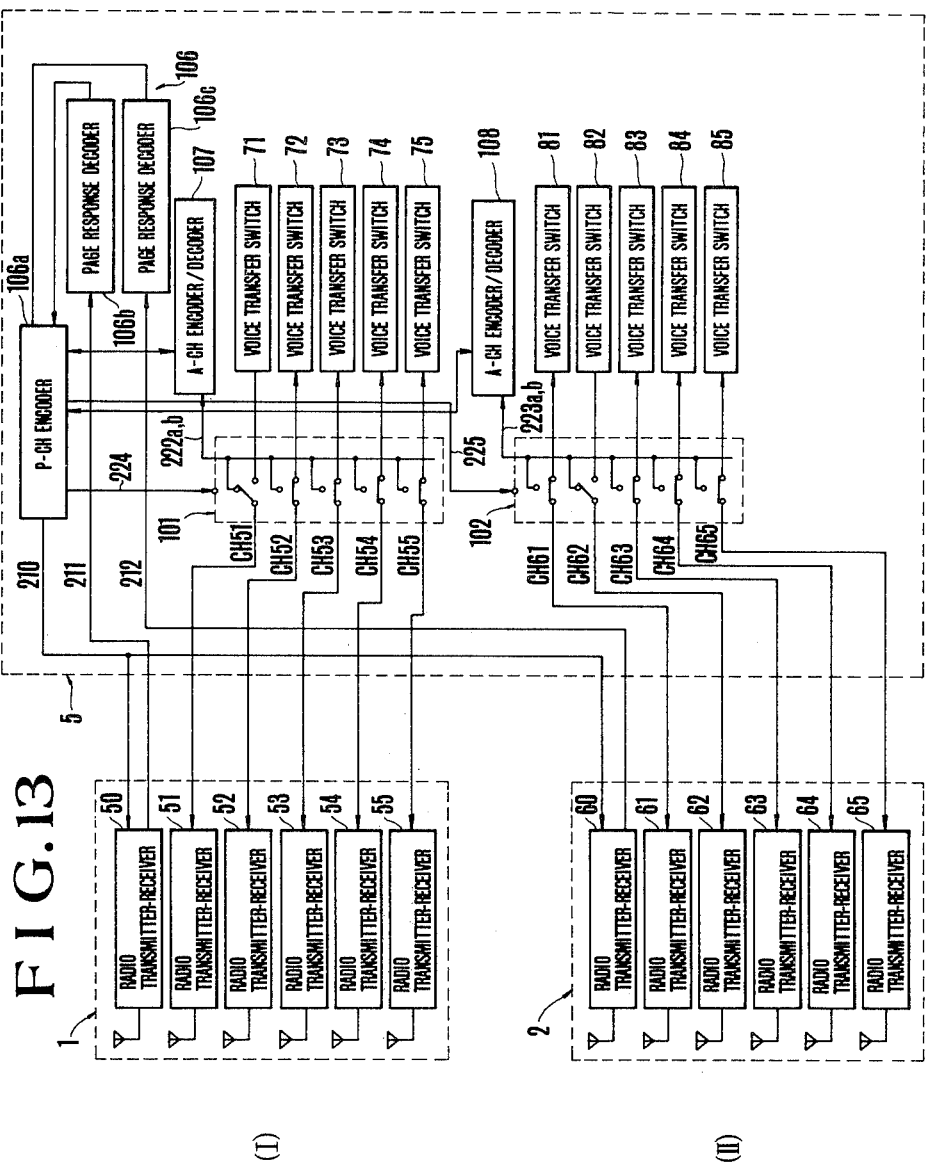
FIG. 13 is a block diagram showing a modified embodiment of this invention.

FIG. 13 shows a simplified block diagram showing another embodiment of this invention, in which vehicles are omitted. In this modification, line connection transfer switches 101 and 102 are added to the system shown in FIG. 8, thereby adding the following performances to the paging controller and access controllers which are designated by reference numerals 106, 107 and 108.

As can be noted from the construction of the line connection transfer switches 101 and 102, in the base station 1, transmitter-receiver 51 or channel CH 51 is connected to the access controller 107 so that the channel CH 51 acts as an access channel, while the other channels CH 52 to CH 55 are connected to voice transfer switches respectively to form speech channels. In the same manner, in the base station 2, a transmitter-receiver 62 participates in access channel and the other transmitter-receivers 61, 63–65 establish speech channels. The channel numbers of these two access channels are always broadcasted from a paging line connection signal transmitter 106a to all zones. Thus all vehicles receive this signal to update the content of the memory device 98.

Figure 14:
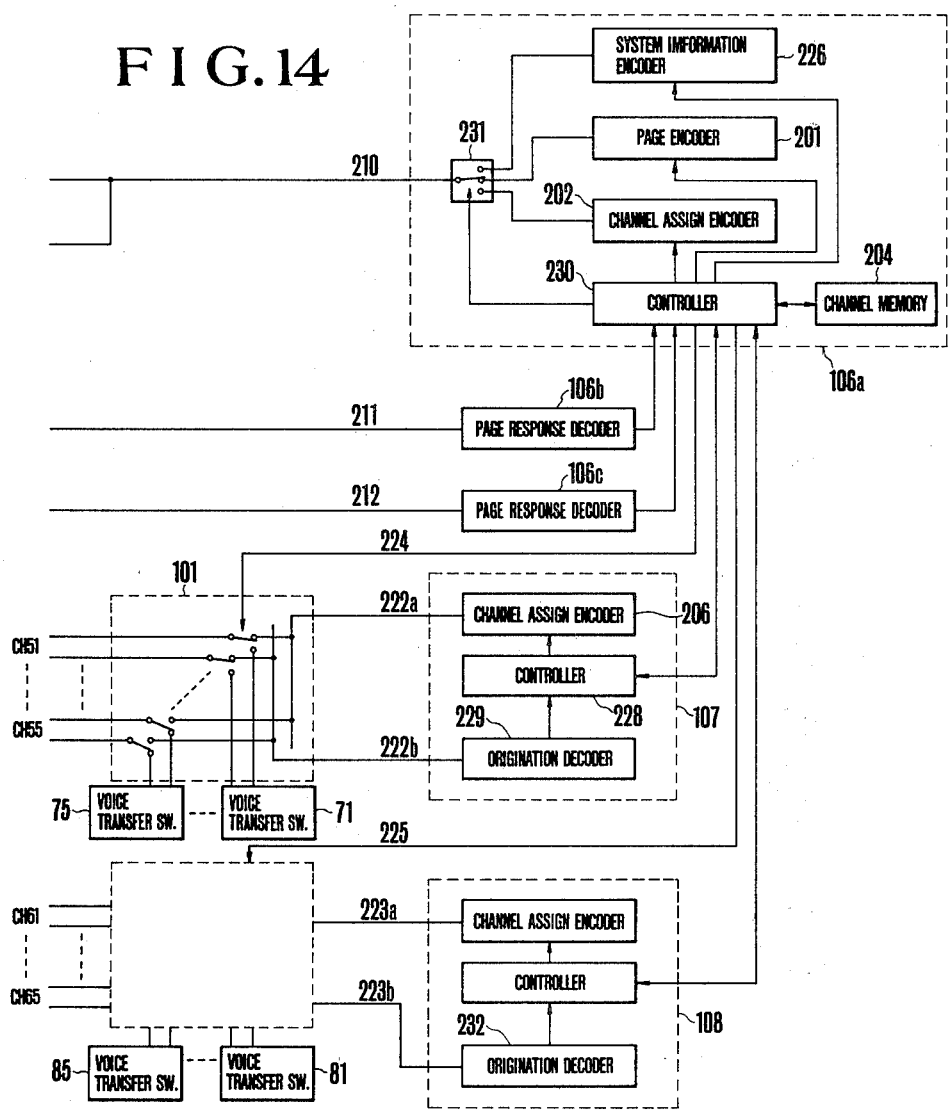
FIG. 14 is a block diagram showing details of the elements 106a, 107 and 108 shown in FIG. 13.

FIG. 14 shows details of the elements 106a, 107 and 108 shown in FIG. 13, more particularly paging channel encoder/decoder 106 and access channel encoders/decoders 107 and 108.

At first, a controller 230 selects any idle speech channel from a memory device 204 for operating switch 101. In this example the access channel encoder/decoder 107 is connected to a channel CH51, while the access channel encoder/decoder 108 is connected to a channel CH62. Other channels are connected to switches 72–75 and 81, 83–85. The fact that the access channels are channels CH51 and CH62 is instructed to system information encoder 226. When a switch 231 is thrown to the side of the encoder 226, an access channel information code is sent to mobile units through line 210.

Where there is a vehicle termination call, switch 231 is thrown to the side of the page encoder 201 to send out a page code in the same manner as in FIG. 13.

In the same manner as in FIG. 13, the origination code from a mobile is applied to either one of origination decoders 229 and 232.

The operation thereafter is the same as that of FIG. 13 except that it is not necessary to discriminate the radio zones. Under these conditions, all speech channels (in this example CH 52-CH 55) are available for conversation. When all the speech channels, except access channels, are under conversation, channel CH 51 is designated as a speech channel and then switch 101 is thrown to the side of switch 71 to use channel 51 as the speech channel. While this condition persists, when the speech of the channel 55 terminates, the switch 101 is transferred to connect the channel CH 55 to the access channel encoder/decoder 107, and the fact that the present access channels are channels 55 and 62 is designated for the system information encoder 226, this fact being informed to the vehicles via switch 231 and line 210.

Let us compare these advantages with those of the first embodiment taking a case wherein the number of zones is 8, the number of channels is 100, and the number of mobile access channels is 8. It can be noted that one speech channel is increased for each base station, meaning an increase of 8 channels when compared with the conventional system shown in FIG. 3.

Although according to this embodiment, it is necessary to use eight (corresponding to 101 and 102) line connection transfer switches and the performances of the paging controller 106 and origination controllers 107 and 108 become more or less complicated, these disadvantages do not present serious problems, and the advantage of increasing 8 speech channels is of significant importance. Thus, according to this invention, the utilization percentage of the available channels can be greatly increased.

What is claimed is:

1. In a mobile communication system wherein a plurality of radio zones, each including one radio base station, the base stations of all radio zones being controlled by a control center which controls a paging signal and an origination signal of a mobile unit, are arranged to form a service area, and each radio zone is provided with at least one mobile access channel and a single mobile paging channel assigned to a radio frequency common to all radio zones, thus establishing speech channels for the mobile units, the improvement wherein said at least one mobile access channel of one radio zone is assigned to a radio frequency which is different from that assigned to adjacent radio zones, said control center is provided with means for controlling an origination signal of said mobile unit for selecting at least one channel among available channels allocated to a radio base station associated with said mobile unit, circuit switching means operatively connected to said origination signal control means for establishing said mobile access channel and means for broadcasting a channel number of said established mobile access channel to all radio zones through said mobile paging channel; and wherein each mobile is provided with a receiver for receiving said channel number on the mobile access channel, means for updating and storing said received channel number and means for sequentially receiving radio waves transmitted through said stored access channel and for comparing intensities of said received radio waves from each of said radio zones with each other to select a mobile access channel adapted to send out said origination signal of said mobile unit.

2. A mobile communication system according to claim 1 wherein said circuit switching means is controlled by said origination signal control means for said operative connection.

3. A mobile communication system according to claim 1 wherein
    said means for broadcasting a channel number is said paging channel which broadcasts the number of all available access channels, and
    said access channels may be randomly selected from said broadcast channels.

* * * * *